United States Patent [19]

Sato et al.

[11] Patent Number: 4,864,568
[45] Date of Patent: Sep. 5, 1989

[54] COMMUNICATION CONTROL SYSTEM

[75] Inventors: Yoshihisa Sato, Nagoya; Yuji Hirabayashi, Aichi; Susumu Akiyama, Kariya; Katsunori Ito, Aichi; Takao Saito, Nagoya, all of Japan

[73] Assignees: Nippondenso Co., Ltd., Kariya; Toyota Jidosha Kabushiki Kaisha, Toyota, both of Japan

[21] Appl. No.: 109,170

[22] Filed: Oct. 14, 1987

[30] Foreign Application Priority Data

Oct. 16, 1986 [JP] Japan .................. 61-246024

[51] Int. Cl.$^4$ .......................... G06F 11/00; H04L 1/00
[52] U.S. Cl. .................. 371/8.2; 340/825.01; 364/424.01
[58] Field of Search ............ 371/8, 22, 9, 10, 11; 370/16, 85; 340/825.01; 379/16; 364/200, 900, 424.01, 424.02, 424.03, 424.05, 425; 375/40

[56] References Cited

U.S. PATENT DOCUMENTS

| | | | |
|---|---|---|---|
| 3,136,984 | 6/1964 | Morrongiello | 340/825.01 |
| 3,518,549 | 6/1970 | Sarati | 340/825.01 |
| 4,068,105 | 1/1978 | Jain et al. | 371/8 |
| 4,076,961 | 2/1978 | Holsinger et al. | 340/825.01 |
| 4,149,241 | 4/1979 | Patterson | 364/200 |
| 4,354,267 | 10/1982 | Mori et al. | 371/8 |
| 4,633,473 | 12/1986 | Ratchford et al. | 371/8 |
| 4,648,088 | 3/1987 | Cagle et al. | 371/8 |
| 4,680,776 | 7/1987 | Ikeuchi et al. | 371/8 |

FOREIGN PATENT DOCUMENTS

| | | | |
|---|---|---|---|
| 126329 | 7/1984 | Japan | 371/8 |
| 160333 | 9/1984 | Japan | 371/8 |
| 224938 | 12/1984 | Japan | 371/8 |
| 60-43951 | 3/1985 | Japan | 371/8 |
| 2142175A | 1/1985 | United Kingdom | 364/424.01 |

OTHER PUBLICATIONS

"Local Area Network Technology Applied to Automotive Electronic Communications", by Ronald W. Cox, pp. 71–77.
"A Small Area Network for Cars", by Ronald L. Michell, pp. 177–184.

Primary Examiner—A. D. Pellinen
Assistant Examiner—Geoffrey S. Evans
Attorney, Agent, or Firm—Cushman, Darby & Cushman

[57] ABSTRACT

Control units are mutually connected by separate common signal lines. A data link is provided between the control units via a preselected one of the common signal lines. A check is made as to whether the preselected common signal line is operating normally or abnormally. When the preselected common signal line is operating abnormally, the preselected common signal line is replaced by another common signal line in the data link.

8 Claims, 6 Drawing Sheets

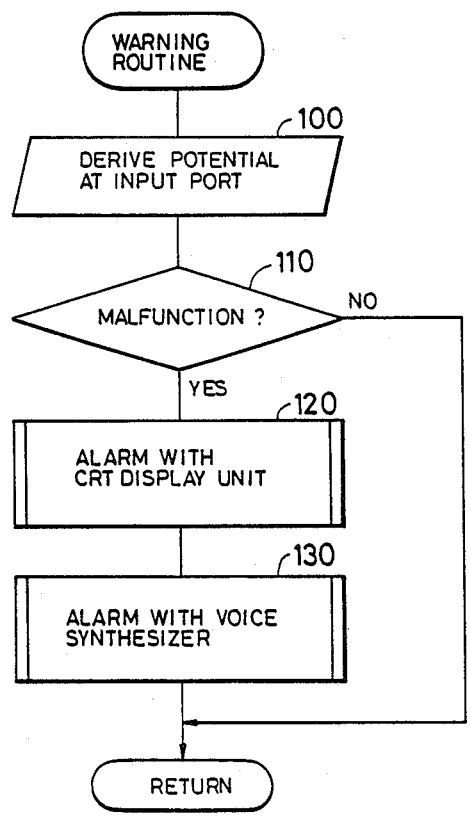

COMMUNICATION CONTROL SYSTEM

BACKGROUND OF THE INVENTION

This invention relates to a system controlling communication between electronic devices.

In some cases, separate electronic control devices including microcomputers are connected via a common data link to provide communication therebetween. For example, in some modern automotive vehicles, separate microcomputer-based control devices such as an engine control unit, a transmission control unit, and a shock absorber control unit, are connected via a common data link to communicate with each other. In such an automotive communication system, sensors detecting control parameters are generally connected to nearest control units respectively. Control data signals derived through the sensors are transmitted between the control units via the common data link. If the common data link fails, a serious problem can arise.

SUMMARY OF THE INVENTION

It is an object of this invention to provide a system enabling reliable communication.

In a communication control system according to a first aspect of this invention, control units are mutually connected by separate common signal lines. A data link is provided between the control units via preselected one of the common signal lines. A check is made as to whether the preselected common signal line is operating normally or abnormally. When the preselected common signal line is operating abnormally, the preselected common signal line is replaced by another common signal line in the data link.

In a communication control system according to a second aspect of this invention, control units are mutually connected by a communication line. Token bus communication is provided between the control units via the communication line. A device detects a change of a potential at a portion of the communication line. The communication line is judged to be wrong in cases where a change of the potential at the portion of the communication line remains undetected for a predetermined time interval.

In a communication control system according to a third aspect of this invention, separate units are connected by first and second separate lines. Communication is provided between the units via the first line. A device detects a malfunction of the first line. When a malfunction of the first line is detected, communication is provided between the units via the second line.

BRIEF DESCRIPTION OF THE DRAWINGS

FIG. 6 is a flowchart of a warning program operating the MPU of the engine ECU of FIG. 5.

Like and corresponding elements are denoted by the same reference characters throughout the drawings.

DESCRIPTION OF THE BASIC PREFERRED EMBODIMENT

Figure 1:
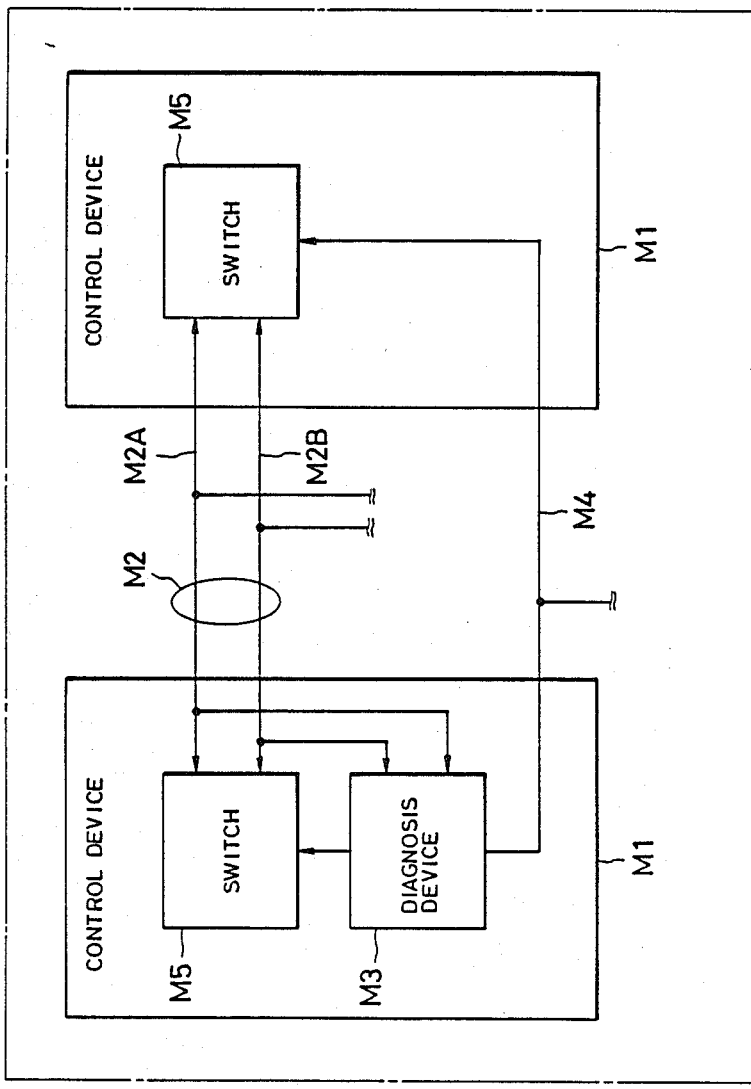
FIG. 1 is a block diagram of a communication control system according to a basic embodiment of this invention.

With reference to FIG. 1, control devices M1 adjusting respective controlled apparatuses (not shown) are mutually connected via a common data link M2 to communicate with each other. Preselected one of separate data signal lines M2A and M2B connected between the control devices M1 is normally used in the common data link M2. It should be noted that each of the data signal lines M2A and M2B means a combination of a true signal line and interfaces within the control devices M1.

At least one control device M1 includes a diagnosis device M3 checking whether or not the data signal lines M2A and M2B are operating normally and generating a diagnosis signal representative thereof. The diagnosis device M3 is connected via a signal line M4 to the other control device M1 to output the diagnosis signal thereto.

Each of the control devices M1 includes a switch M5 which serves to select either the data signal line M2A or the data signal line M2B. The diagnosis signal is applied to the switches M5.

When the diagnosis device M3 detects that the preselected data signal line is operating abnormally, the switches M5 select the other data signal line in accordance with the diagnosis signal so that the other data signal line is used in data communication between the control devices M1. Accordingly, in the event that one of the data signal lines M2A and M2B fails due to a cause such as a break, the data communication between the control devices M1 is maintained by automatically selecting and using the normal data signal line.

DESCRIPTION OF THE FIRST SPECIFIC PREFERRED EMBODIMENT

Figure 2:
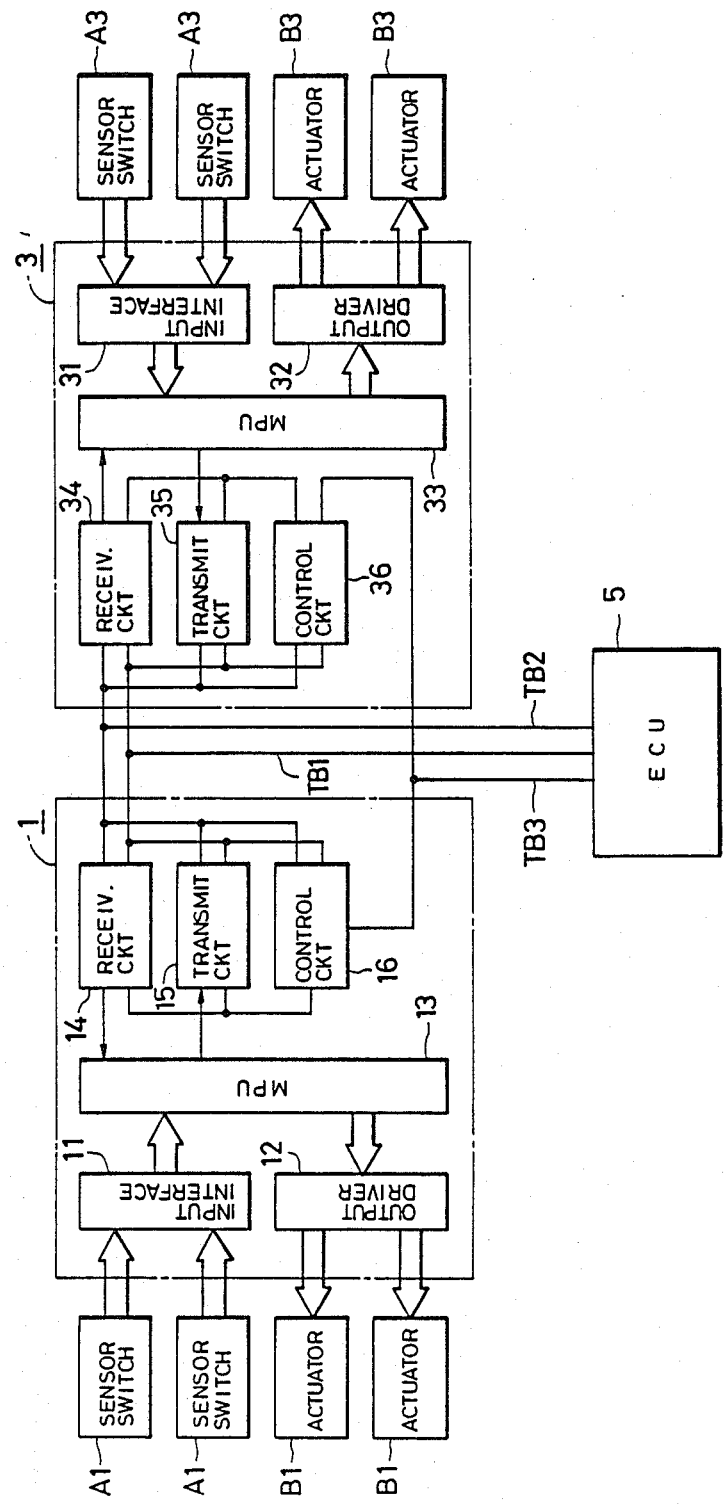
FIG. 2 is a block diagram of a communication control system according to a first specific embodiment of this invention.

With reference to FIG. 2, an automotive vehicle is equipped with electronic control units (ECUs), such as an engine ECU 1, a shock absorber ECU 3, and a transmission ECU 5. The ECUs adjust respective controlled apparatuses.

The engine ECU 1 includes a combination of an input interface 11, an output driver 12, and a logical operation circuit or microprocessor unit (MPU) 13. The MPU 13 has a combination of a central processing unit (CPU), a read-only memory (ROM), and a random-access memory (RAM). Sensors and switches A1 detect engine and vehicle operating conditions and generate signals indicative thereof which are applied to the input interface 11. The output driver 12 feeds control signals to actuators B1 via which an automotive engine can be controlled.

The engine ECU 1 includes a receiving circuit 14 and a transmitting circuit 15 via which the engine ECU 1 receives data signals from and transmits data signals to the other ECUs 3 and 5. The receiving circuit 14 and the transmitting circuit 15 are connected to the MPU 13. The engine ECU 1 also includes a communication control circuit 16 connected to the receiving circuit 14 and the transmitting circuit 15. This device 16 controls the receiving circuit 14 and the transmitting circuit 15.

The shock absorber ECU 3 includes a combination of an input interface 31, an output driver 32, and a logical operation circuit or microprocessor unit (MPU) 33. The MPU 33 has a combination of a central processing unit (CPU), a read-only memory (ROM), and a random-access memory (RAM). Sensors and switches A3 detect engine and vehicle operating conditions and generate signals indicative thereof which are applied to the input interface 31. The output driver 32 feeds control signals to actuators B3 via which automotive shock absorbers can be controlled.

The shock absorber ECU 3 includes a receiving circuit 34 and a transmitting circuit 35 via which the shock absorber ECU 3 receives data signals from and transmits data signals to the other ECUs 1 and 5. The receiving circuit 34 and the transmitting circuit 35 are connected to the MPU 33. The shock absorber ECU 3 also includes a communication control circuit 36 connected to the receiving circuit 34 and the transmitting circuit 35. This device 36 controls the receiving circuit 34 and the transmitting circuit 35.

The transmission ECU 5 includes components designed and connected in a manner similar to the components of the shock absorber ECU 3. The transmission ECU 5 is supplied with output signals of sensors and switches (not shown) detecting engine and vehicle operating conditions. The transmission ECU 5 outputs a control signal or signals to an actuator or actuators (not shown) via which an automotive transmission can be controlled.

The receiving circuit 14 of the engine ECU 1, the transmitting circuit 15 of the engine ECU 1, the receiving circuit 34 of the shock absorber ECU 3, the transmitting circuit 35 of the shock absorber ECU 3, a receiving circuit of the transmission ECU 5, and a transmitting circuit of the transmission ECU 5 are mutually connected via a common data link including separate signal lines TB1 and TB2. Data signals derived through the sensors and the switches can be transmitted between the ECUs via the common data link. For example, the engine and vehicle data signals derived through the sensors and switches A1 can be transmitted from the engine ECU 1 to the shock absorber ECU 3 and the transmission ECU 5 via the common signal lines TB1 and TB2. In general, the transmitted data signals are in a serial digital form or in the form of a binary bit sequence.

The data communication between the ECUs is preferably of the token bus type in which transmission rights (called "tokens") to send data signals are circulated through the ECUs at a fixed period in a predetermined sequence or pattern. Accordingly, data signals are sequentially outputted to the common signal line TB1 or TB2 at fixed time intervals T. In this token bus communication, during each of the fixed time intervals T, at least one data signal occurs in the common signal line TB1 or TB2. In general, token signals representing transmission rights are sequentilly distributed to the ECUs via the common signal line TB1 or TB2 to enable the circulation of the transmission rights through the ECUs. Accordingly, during each of the fixed time intervals T, one token signal occurs in the common signal line TB1 or TB2.

It should be noted that the data communication between the ECUs may be of polling/selecting type.

The communication control circuit 16 of the engine ECU 1, the communication control circuit 36 of the shock absorber ECU 3, and a communication control circuit of the transmission ECU 5 are mutually connected via a communication control signal line TB3.

Figure 3:
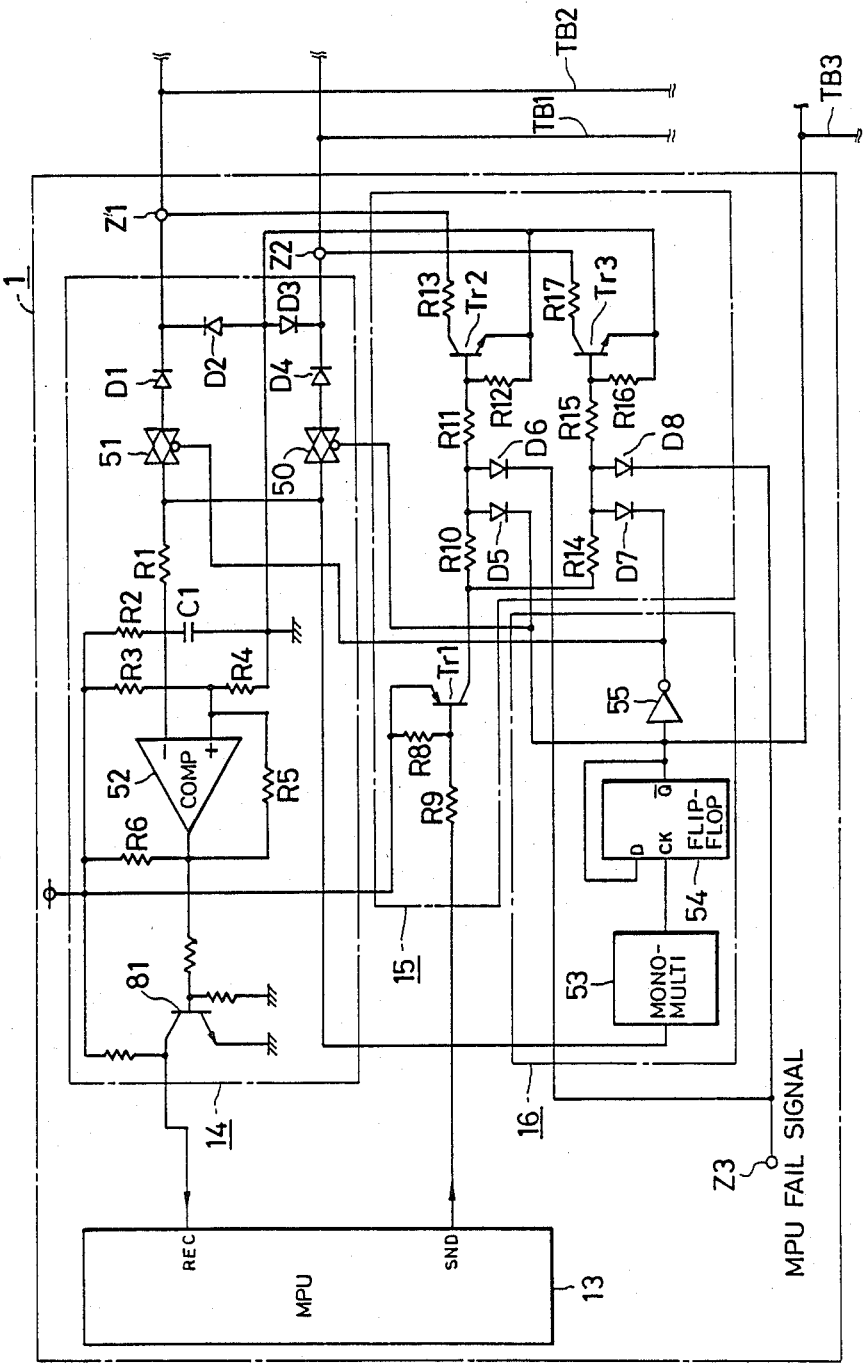
FIG. 3 is a diagram of the MPU (microprocessor unit), the receiving circuit, the transmitting circuit, and the communication control circuit of the engine ECU (electronic control unit) of FIG. 2.

As shown in FIG. 3, the receiving circuit 14 of the engine ECU 1 includes a first analog switch 50 selectively allowing and inhibiting the admission of data signals from the common signal line TB1 into the engine ECU 1, and a second analog switch 51 selectively allowing and inhibiting the admission of data signals from the other common signal line TB2 into the engine ECU 1. It should be noted that these data signals are outputted to the common signal lines TB1 and TB2 from the other ECUs 3 and 5. A comparator 52 within the receiving circuit 14 derives a binary signal from the data signal inputted via the analog switches 50 and 51 by comparing the level of the inputted data signal with a predetermined reference level. The binary signal is outputted from the comparator 52 to a receiving port REC of the MPU 13 of the engine ECU 1 via a buffer including a transistor 81. A circuit protective network of diodes D1-D4 is connected between the analog switches 50 and 51, and the common signal lines TB1 and TB2. Resistors R1-R6 and a capacitor C1 connected to the comparator 52 generates the reference level and limits currents. The receiving circuit 14 operates as follows. When the analog switches 50 and 51 are closed, data signals are inputted from the common signal lines TB1 and TB2 to an inverting input terminal of the comparator 52. The comparator 52 converts the inputted data signal into a binary signal by comparing the level of the inputted data signal with the reference level, The binary signal is applied to the receiving port REC of the MPU 13 via the buffer transistor 81.

The transmitting circuit 15 of the engine ECU 1 includes a transistor Tr1 which is made conductive and unconductive in accordance with a binary data signal outputted from the MPU 13 of the engine ECU 1 via a sending port SND of the MPU 13. Transistors Tr2 and Tr3 are made conductive and unconductive when the transistor Tr1 goes conductive and unconductive The transistor Tr2 is connected to the common signal line TB2 via a junction Z1. The transistor Tr3 is connected to the other common signal line TB1 via a junction Z2. Resistors R8-R17 connected to the transistors Tr1-Tr3 generate suitable biases and limit currents. Circuit protective diodes D5-D8 are connected to the transistors Tr2 and Tr3. The transmitting circuit 15 operates as follows. The transistor Tr1 is made conductive and unconductive in accordance with a binary data signal outputted from the sending port SND of the MPU 13. When the transistor Tr1 goes conductive and unconductive, the transistor Tr2 or Tr3 is made conductive and unconductive. The potential at the common signal line TB1 goes low and high in accordance with change of the transistor Tr3 between its conductive and unconductive states. The potential at the common signal line TB2 goes low and high in accordance with change of the transistor Tr2 between its conductive and unconductive states In this way, the binary data signal is outputted from the senind port SND of the MPU 13 to the common signal line TB1 or TB2 via the transmitting circuit 15.

The communication control circuit 16 of the engine ECU 1 includes a monostable multivibrator 53 whose input terminal is subjected to an output signal from the analog switch 50 or 51. An output terminal of the monostable multivibrator 53 is connected to an input terminal CK of a flip-flop 54 within the communication control circuit 16. An inverting output terminal of the flip-flop 54 is connected to an input terminal of an invertor 55 within the communication control circuit 16. The inverting output terminal of the flip-flop 54 is connected to an input terminal D of the flip-flop 54, a control gate of the analog switch 50 within the receiving circuit 14, the transistor Tr2 within the transmitting circuit 15 via the diode D5, and the communication control signal line TB3. The output terminal of the invertor 55 is connected to a control gate of the analog switch 51 within the receiving circuit 14, and the transistor Tr3 within the transmitting circuit 15 via the diode D7.

The monostable multivibrator 53 is preferably of the retriggerable type, being triggered by each high level pulse from the analog switch 50 and 51. When the monostable multivibrator 53 receives a high level trigger pulse from the analog switch 50 or 51, the multivibrator 53 outputs a low level pulse having a predetermined duration T1 slightly longer than the previously-mentioned fixed time interval T. After the low level pulse output of the monostable multivibrator 53 disappears, the output of the multivibrator 53 remains at a high level until a next high level trigger pulse occurs. The pulse duration T1 can be easily adjusted by changing a time constant depending on the values of a resistor and a capacitor within the monostable multivibrator 53. The monostable multivibrator 53 is preferably designed so that the output signal of the monostable multivibrator 53 initially assumes a low level state.

The diode D6 connected to the transistor Tr2 within the transmitting circuit 15 leads to a terminal Z3. Also, the diode D8 connected to the transistor Tr3 within the transmitting circuit 15 leads to the terminal Z3.

Figure 4:
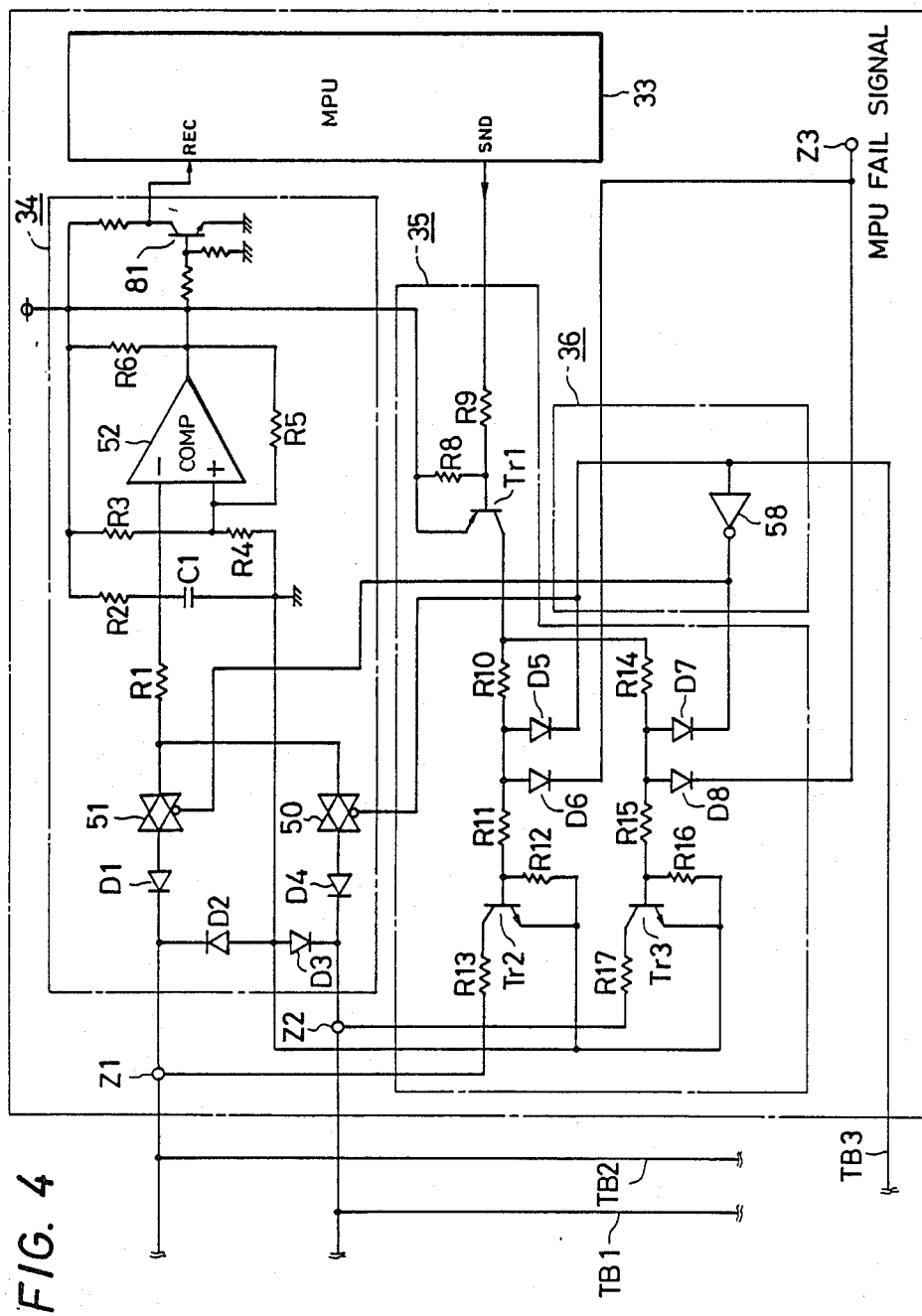
FIG. 4 is a diagram of the MPU, the receiving circuit, the transmitting circuit, and the communication control circuit of the shock absorber ECU of FIG. 2.

As shown in FIG. 4, an internal structure of the receiving circuit 34 of the shock absorber ECU 3 is similar to the internal structure of the receiving circuit 14 of the engine ECU 1. The receiving circuit 34 is connected between a receiving port REC of the MPU 33 of the shock absorber ECU 3 and the common signal lines TB1 and TB2. An internal structure of the transmitting circuit 35 of the shock absorber ECU 3 is similar to the internal structure of the transmitting circuit 15 of the engine ECU 1. The transmitting circuit 35 is connected between a sending port SND of the MPU 33 of the shock absorber ECU 3 and the common signal lines TB1 and TB2.

The communication control circuit 36 of the shock absorber ECU 3 includes an invertor 58. An input terminal of the invertor 58 is connected to the communication control singal line TB3. An output terminal of the invertor 58 is connected to a control gate of an analog switch 51 within the receiving circuit 34, and a transistor Tr3 within the transmitting circuit 35 via a diode D7. The communication signal line TB3 is connected to a control gate of an analog switch 50 within the receiving circuit 34, and the transistor Tr2 within the transmitting circuit 35 via a diode D5.

It should be noted that the same reference characters denote the corresponding elements of the receiving circuit 14 and the transmitting circuit 15 of the engine ECU 1, and the receiving circuit 34 and the transmitting circuit 35 of the shock absorber ECU 3.

Operation of the communication control system of this embodiment will be described hereinafter in two cases, that is, in a first case where the common signal line TB1 is operating normally and in a second case where the common signal line TB1 is operating abnormally.

(I) IN A CASE WHERE SIGNAL LINE TB1 IS NORMAL

As described previously, transmission rights (tokens) to send data signals to the common signal line TB1 are sequentially distributed to the ECUs at the fixed time intervals T. Accordingly, one token signal and at least one data signal occur in the common signal line TB1 for each of the fixed time intervals T.

When the output of the monostable multivibrator 53 within the communication control circuit 16 of the engine ECU 1 assumes a low level, the flip-flop 54 closes the analog switch 50 within the receiving circuit 14 of the engine ECU 1 so that a data signal or token signal is inputted from the common signal line TB1 to the rear stage of the receiving circuit 14 including the comparator 52. At the same time, the analog switch 51 within the receiving circuit 14 is opened. The inputted data signal or token signal causes a high level trigger pulse which is applied to the monostable multivibrator 53 via the analog switch 50. It should be noted that any data signal or token signal contains at least one high level component and at least one low level component. The trigger pulse holds the output of the monostable multivibrator 53 in the low level, thereby keeping the analog switch 50 closed so that a next data signal or token signal is inputted from the common signal line TB1 to the rear stage of the receiving circuit 14. As described previously, the output of the monostable multivibrator 53 remains at the low level for a predetermined duration T1 from the moment of the reception of a high level trigger pulse. Since the predetermined duration T1 is longer than the fixed time interval T, the monostable multivibrator 53 always receives a high level trigger pulse prior to the end of the duration T1 from the reception of the preceding high level trigger pulse. Accordingly, the analog switch 50 continues to be closed so that data and token signals are successively inputted from the common signal line TB1 to the rear stage of the receiving circuit 14. The inputted data and token signals are transmitted to the receiving port REC of the MPU 13 of the engine ECU 1 after they undergo a wave shaping process in the comparator 52 within the receiving circuit 14.

While the output of the monostable multivibrator 53 within the communication control circuit 16 of the engine ECU 1 remains at the low level, the flip-flop 54 enables the output of the invertor 55 within the communication control circuit 16 to remain at the high level so that the diode D7 within the transmitting circuit 15 allows the transistor Tr3 to be continuously enabled. Under the same condition, the diode D5 within the transmitting circuit 15 allows the transistor Tr2 to be continuously disabled. Accordingly, data and token signals are successively outputted to the common signal line TB1 from the sending port SND of the MPU 13 within the engine ECU 1 via the transmitting circuit 15.

The low level output of the monostable multivibrator 53 within the communication control circuit 16 of the engine ECU 1 is transmitted via the flip-flop 54 and the communication control signal line TB3 to the invertor 58 within the communication control circuit 36 of the shock absorber ECU 3, the diode D5 within the transmitting circuit 35 of the shock absorber ECU 3, and the analog switch 50 within the receiving circuit 34 of the shock absorber ECU 3. At the same time, the high level output of the invertor 58 caused by the low level signal from the monostable multivibrator 53 is applied to the diode D7 within the transmitting circuit 35 of the shock absorber ECU 3, and the analog switch 51 within the receiving circuit 34 of the shock absorber ECU 3. Accordingly, the analog switch 50 is closed so that data and token signals are inputted from the common signal line TB1 to the receiving port REC of the MPU 33 of the shock absorber ECU 3 via the receiving circuit 34. In addition, the transistor Tr3 within the transmitting circuit 34 of the shock absorber ECU 3 is enabled so that data and token signals are outputted to the common signal line TB1 from the sending port SND of the MPU 33 of the shock absorber ECU 3 via the transmitting circuit 35.

Also, the low level output of the monostable multivibrator 53 within the communication control circuit 16 of the engine ECU 1 is transmitted via the flip-flop 54 and the communication control signal line TB3 to the transmission ECU 5. The transmission ECU 5 inputs data and token signals from the common signal line TB1 and outputs data and token signals to the common signal line TB1 in a manner similar to the shock absorber ECU 3.

(II) IN A CASE WHERE SIGNAL LINE TB1 IS ABNORMAL

When the common signal line TB1 breaks or short-circuits, the potential at the connection between the engine ECU 1 and the common signal line TB1 moves to a given level independent of data and token signals applied to the common signal line TB1. Thereafter, the potential at the connection between the engine ECU 1 and the common signal line TB1 remains at the given level independent of data and token signals applied to the common signal line TB1. Accordingly, during such a malfunction of the common signal line TB1, any high level trigger pulses do not occur so that the output of the monostable multivibrator 53 within the communication control circuit 16 of the engine ECU 1 moves to and then remains at the high level.

The high level output of the monostable multivibrator 53 causes the flip-flop 54 to output a high level signal which opens the analog switch 50 within the receiving circuit 14 of the engine ECU 1. In addition, the high level output of the monostable multivibrator 53 causes the invertor 55 within the communication control circuit 16 to output a low level signal which closes the analog switch 51 within the receiving circuit 14. Accordingly, data and token signals can be inputted from the common signal line TB2 to the receiving port REC of the MPU 13 of the engine ECU 1 via the receiving circuit 14.

The data or token signal inputted from the common signal line TB2 causes a high level trigger pulse which is inputted to the monostable multivibrator 53 via the analog switch 51. When the monostable multivibrator 53 receives the trigger pulse, the output signal of the monostable multivibrator 53 returns to a low level state. Since the flip-flop 54 responds only to a change of the output signal of the monostable multivibrator 53 from a low level state to a high level state, the output signal from the flip-flop 54 remains at the high level state independent of the return of the monostable multivibrator output signal to the low level state. Accordingly, the analog switches 50 and 51 within the receiving circuit 14 of the engine ECU 1 continue to be open and closed respectively so that data and token signals are continuously inputted from the common signal line TB2 to the engine ECU 1.

The high level output of the flip-flop 54 causes the diode D5 within the transmitting circuit 15 of the engine ECU 1 to enable the transistor Tr2 within the transmitting circuit 15. At the same time, the low level output of the invertor 55 causes the diode D7 within the transmitting circuit 15 to disable the transistor Tr3 within the transmitting circuit 15. Accordingly, data and token signals can be outputted from the sending port SND of the MPU 13 of the engine ECU 1 to the common signal line TB2 via the transmitting circuit 15.

The high level output of the flip-flop 54 within the communication control circuit 16 of the engine ECU 1 is transmitted via the communication control signal line TB3 to the invertor 58 within the communication control circuit 36 of the shock absorber ECU 3, the diode D5 within the transmitting circuit 35 of the shock absorber ECU 3, and the analog switch 50 within the receiving circuit 34 of the shock absorber ECU 3. At the same time, the low level output of the invertor 58 caused by the high level signal from the flip-flop 54 is applied to the diode D7 within the transmitting circuit 35 of the shock absorber ECU 3, and the analog switch 51 within the receiving circuit 34 of the shock absorber ECU 3. Accordingly, the analog switch 50 within the receiving circuit 34 is opened but the analog switch 51 within the receiving circuit 34 is closed so that data and token signals are inputted from the common signal line TB2 to the receiving port REC of the MPU 33 of the shock absorber ECU 3 via the receiving circuit 34. In addition, the transistor Tr2 within the transmitting circuit 34 is enabled so that data and token signals are outputted to the common signal line TB2 from the sending port SND of the MPU 33 of the shock absorber ECU 3 via the transmitting circuit 35.

Also, the high level output of the flip-flop 54 within the communication control circuit 16 of the engine ECU 1 is transmitted via the communication control signal line TB3 to the transmission ECU 5. Accordingly, the transmission ECU 5 inputs data and token signals from the common signal line TB2 and outputs data and token signals to the common signal line TB2 in a manner similar to the shock absorber ECU 3.

In this way, when a malfunction of the common signal line TB1 occurs, the other common signal line TB2 is used for communication between the ECUs in place of the wrong common signal line TB1. Accordingly, reliable communication between the ECUs can be performed. A malfunction of the common signal line TB1 is detected by a structure including the monostable multivibrator 53 which checks whether or not a change of the potential at the portion of the common signal line TB1 connected to the engine ECU 1 occurs during the predetermined time interval T1.

When the common signal line TB2 fails, the other common signal line TB1 is used for communication between the ECUs in a similar manner. When both of the common signal lines TB1 and TB2 fail, the ECUs are ready for receiving signals from the common signal line TB1.

When the MPU 13 of the engine ECU 1 malfunctions, e.g., when the MPU 13 goes out of control, a low level MPU fail signal is applied to the terminal Z3. The MPU fail signal causes the diodes D6 and D8 within the transmitting circuit 15 of the engine ECU 1 to disable the transistors Tr2 and Tr3 within the transmitting circuit 15. When the transistors Tr2 and Tr3 are disabled, the transmission of data and token signals from the sending port SND of the MPU 13 to the common signal lines TB1 and TB2 is inhibited. Accordingly, in the event of a malfunction of the MPU 13, the transmission of data and token signals from the MPU 13 to the common signal lines TB1 and TB2 is inhibited. It should be noted that such a mulfunction of the MPU 13 can be detected by monitoring a watch dog signal outputted by the MPU 13 which normally contains regularly separated pulses.

Modifications may be made in this embodiment. For example, in a first modification of this embodiment, the MPU 13 of the engine ECU 1 is programmed to detect a malfunction of the common signal line TB1 in place of the communication control circuit 16. In a second modification of this embodiment, the common signal line TB2 is normally used while the other common signal line TB1 is used in the event of a malfunction of the common signal line TB2.

DESCRIPTION OF THE SECOND SPECIFIC PREFERRED EMBODIMENT

Figure 5:
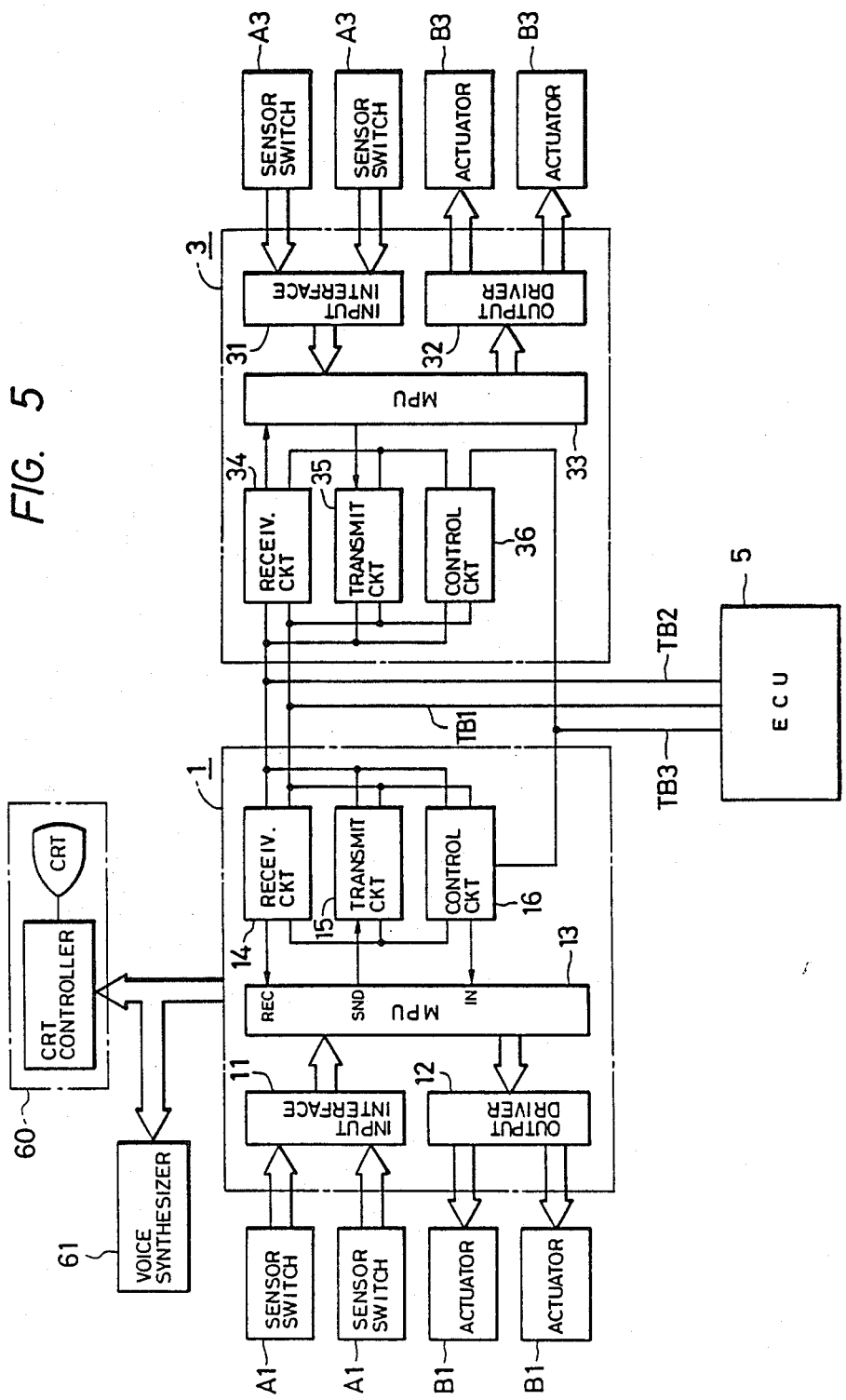
FIG. 5 is a block diagram of a communication control system according to a second specific embodiment of this invention.

FIG. 5 shows a second specific embodiment of this invention which is similar to the embodiment of FIGS. 2-4 except for design changes and additional devices described hereinafter.

As shown in FIG. 5, the second specific embodiment includes a cathode-ray tube (CRT) display unit 60 and a voice synthesizer 61 connected to the MPU 13 of the engine ECU 1. The display unit 60 includes a CRT and a CRT controller connected to the CRT. In the embodiment of FIG. 5, the output signal of the monostable multivibrator 53 (see FIG. 3) within the communication control circuit 16 of the engine ECU 1 is applied to an input port IN of the MPU 13.

The MPU 13 of the engine ECU 1 operates in accordance with a program including a warning routine. The warning routine is reiterated at regular intervals by a hardware-based interruption process. FIG. 6 is a flowchart of the warning program.

As shown in FIG. 6, a first step 100 of the warning program derives the current potential at the input terminal IN of the MPU 13. A step 110 following the step 100 determines whether or not the derived current potential at the input terminal IN of the MPU 13 is high, that is, whether or not a malfunction of the common signal line TB1 is present. When the potential is not high, that is, when a malfunction of the common signal line TB1 is absent, the warning routine ends and the program returns to a main routine. When the potential is high, that is, when a malfunction of the common signal line TB1 is present, the program advances to a step 120 which allows the CRT display unit 60 to indicate the malfunction of the common signal line TB1. A step 130 following the step 120 allows the voice synthesizer 61 to generate a voice alarm that the common signal line TB1 fails. After the step 130, the warning routine ends and the program returns to the main routine. In this way, a vehicle passenger is visually and auditorily informed of a malfunction of the common signal line TB1.

What is claimed is:

1. A communication control system for a vehicle comprising:
    (a) a plurality of separate units mounted on the vehicle;
    (b) first and second separate lines connected to each of the separate units, thereby connecting the units;
    (c) means for providing communication between the units via the first line, wherein said communication causes at least one change of a potential at the first line during a first predetermined interval when the first line is in a normal state of operation;
    (d) means for detecting a malfunction of the first line, said detecting means comprising means for determining the occurrence of at least one change of a potential at a portion of the first line during a second predetermined interval, said second predetermined interval being longer than the first predetermined interval; and
    (e) means for providing communication between the units via the second line when a malfunction of the first line is detected 2. The system of claim 1 wherein said detecting means comprises a monostable multivibrator, said monostable multivibrator determining said second predetermined interval.

3. A communication control system comprising:
    (a) a plurality of control units;
    (b) a plurality of separate common signal lines connected to each of the control units, thereby connecting the control units;
    (c) means for providing a data link between the control units via a preselected one of the plurality of common signal lines, and for outputting transmission data to the preselected line during every first predetermined interval;
    (d) means for detecting a change of a potential on the preselected line;
    (e) means for determining a malfunction on the preselected line and outputting a malfunction signal in response thereto when a change of the potential at the portion of the preselected line remains undetected for a second predetermined interval, the second predetermined interval being longer than the first predetermined interval, said determining and outputting means being disposed within a first of said plurality of control units;
    (f) a malfunction signal line connected to each of said plurality of control units, said malfunction signal line transmitting said malfunction signal from said first of said plurality of control units to another of the control units; and
    (g) means for replacing the preselected line with another of the common signal lines in response to said malfunction signal.

4. The system of claim 3 wherein said data link provides token bus communication between the control units.

5. The system of claim 3 wherein said determining means comprises a monostable multivibrator for determining the second predetermined interval.

6. The system of claim 3 wherein the replacing means simultaneously inhibits the data link on the preselected line and enables the data link on the another of the common signal lines in response to the malfunction signal.

7. A communication control system comprising:
    (a) first and second units;
    (b) first and second separate data signal lines connecting the control units;
    (c) means for transmitting data from the first unit to the second unit via the first data signal line;
    (d) means disposed in the second unit for detecting a malfunction of the first data signal line and generating a malfunction signal representative thereof, said malfunction detecting means generating said malfunction signal when said malfunction detecting means does not detect a predetermined change in potential on said first data signal line within a predetermined interval;

(e) malfunction signal line connecting the first and second units and being separate from the first and second data signal lines;

(f) means for transmitting the malfunction signal from the second unit to the first unit via the malfunction signal line;

(g) switching means, disposed in the first unit, for selecting the second data signal line in place of the first signal line in response to the malfunction signal, said switching means disabling said first data signal line at the same time said second data second line is selected;

(h) means for transmitting data from the first unit to the second unit via the second data signal line.

8. The system of claim 7 wherein said malfunction detecting means comprises a monostable multivibrator for determining the predetermined interval.

* * * * *